US008680780B2

(12) United States Patent
Yang et al.

(10) Patent No.: US 8,680,780 B2
(45) Date of Patent: Mar. 25, 2014

(54) LED BACKLIGHT DRIVING CIRCUIT, BACKLIGHT MODULE, AND LCD DEVICE

(75) Inventors: Xiang Yang, Shenzhen (CN); Liangchan Liao, Shenzhen (CN); Poshen Lin, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/578,140

(22) PCT Filed: Jul. 9, 2012

(86) PCT No.: PCT/CN2012/078339
§ 371 (c)(1),
(2), (4) Date: Oct. 22, 2012

(87) PCT Pub. No.: WO2014/005335
PCT Pub. Date: Jan. 9, 2014

(65) Prior Publication Data
US 2014/0002772 A1  Jan. 2, 2014

(30) Foreign Application Priority Data
Jul. 2, 2012 (CN) .......................... 2012 1 0223640

(51) Int. Cl.
*H05B 39/04* (2006.01)
*H05B 37/00* (2006.01)
(52) U.S. Cl.
USPC .............................. 315/291; 315/127; 315/312
(58) Field of Classification Search
None
See application file for complete search history.

(56) References Cited
U.S. PATENT DOCUMENTS 7,705,709 B2 *  4/2010  Saito et al. ...................... 338/21
8,084,961 B2 * 12/2011  Chao et al. ..................... 315/307
8,247,992 B2 *  8/2012  Liu et al. ........................ 315/291
(Continued)

FOREIGN PATENT DOCUMENTS

CN         2824495 Y    10/2006
CN       101005722 A     7/2007
(Continued)

OTHER PUBLICATIONS

TDK, Chip Varistors, Countermeasure for surge voltage and static electricity, Sep. 2011.*
(Continued)

*Primary Examiner* — Alexander H Taningco
*Assistant Examiner* — Nelson Correa
(74) *Attorney, Agent, or Firm* — IPro, Inc.; Na Xu

(57) ABSTRACT

A light emitting diode (LED) backlight driving circuit includes LED lightbar(s) and a control module; the control module includes a dimming controllable switch. The LED lightbars are connected with the dimming controllable switch in series. Two ends of the dimming controllable switch are connected with a varistor in parallel. Because two ends of the dimming controllable switch are connected with a varistor in parallel, when the dimming controllable switch is switched off, a current of the branch circuit is suddenly reduced, the voltage withstood by the LED lightbars is greatly reduced, and the voltage on two ends of the dimming controllable switch is increased. Then, under action of high voltage, resistance of the varistors connected in parallel is reduced, and the current of a new branch circuit formed by the LED lightbars and the varistor is also increased. Thus, the voltage withstood by the LED lightbars is increased again and the voltage on two ends of the dimming controllable switch is reduced.

16 Claims, 1 Drawing Sheet

(56) References Cited

U.S. PATENT DOCUMENTS

| | | | |
|---|---|---|---|
| 8,324,816 B2 * | 12/2012 | Ohashi et al. | 315/127 |
| 8,461,769 B2 * | 6/2013 | Shiu et al. | 315/291 |
| 2010/0315572 A1 | 12/2010 | LoCascio | |

FOREIGN PATENT DOCUMENTS

| | | |
|---|---|---|
| CN | 101083860 A | 12/2007 |
| CN | 101335449 A | 12/2008 |
| CN | 102136252 A | 7/2011 |
| CN | 102262862 A | 11/2011 |
| CN | 102273324 A | 12/2011 |
| CN | 102307411 A | 1/2012 |
| JP | 2001-210122 A | 8/2001 |

OTHER PUBLICATIONS

Liu Chang, the International Searching Authority written comments, Apr. 2013, CN.

* cited by examiner

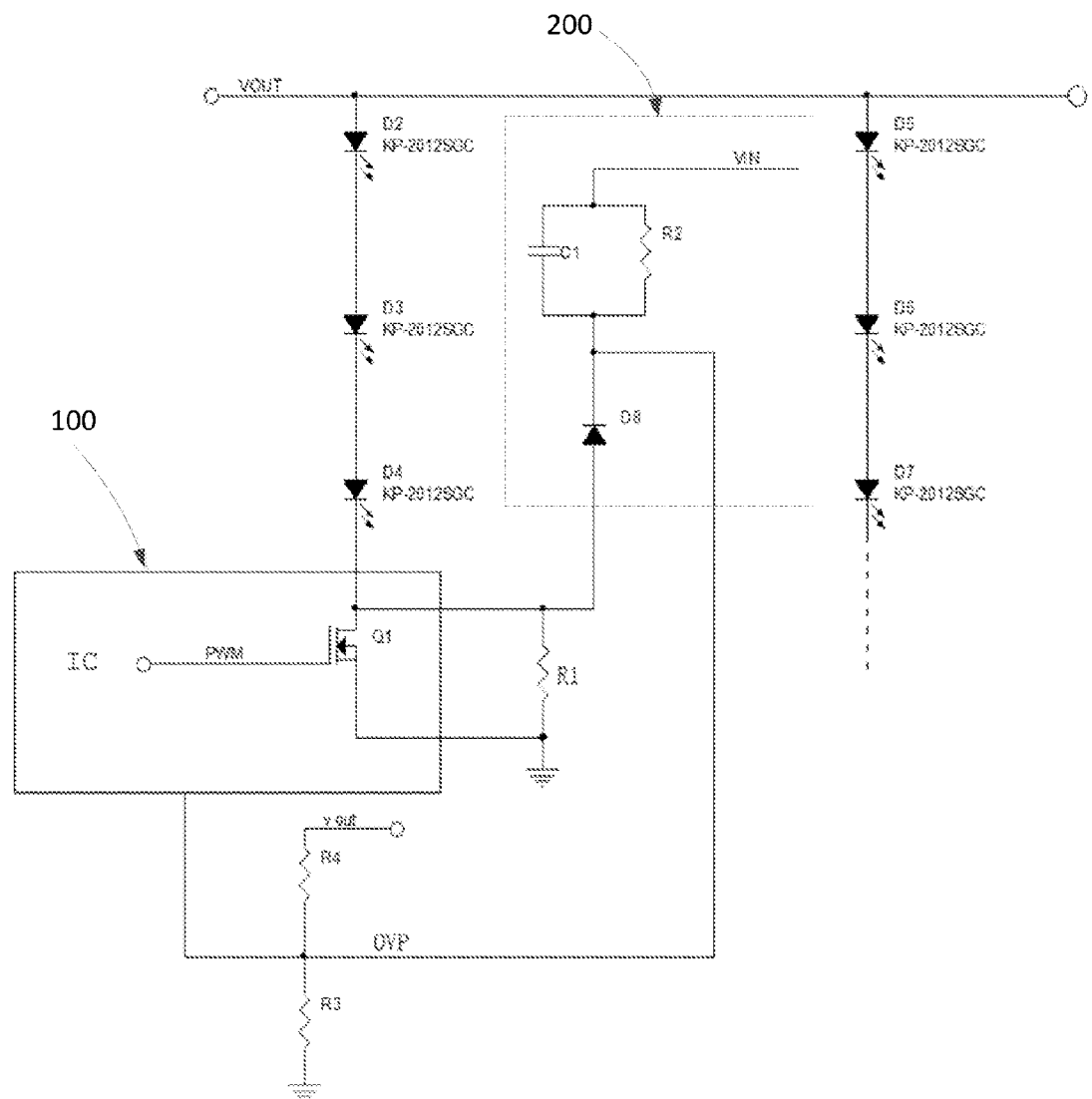

LED BACKLIGHT DRIVING CIRCUIT, BACKLIGHT MODULE, AND LCD DEVICE

This application is a national stage application of PCT application PCT/CN2012/078339 filed on Jul. 9, 2012, which is based on and claims priority to Chinese patent application 201210223640.X filed on Jul. 2, 2012. The entirety of each of the above-mentioned applications is hereby incorporated by reference herein in its entirety.

TECHNICAL FIELD

The present disclosure relates to the field of liquid crystal displays (LCDs), and more particularly to a light emitting diode (LED) backlight driving circuit, a backlight module, and an LCD device.

BACKGROUND

In a typical liquid crystal display (LCD) device, light emitting diodes (LEDs) are adopted as backlight sources. A specific principle is that a plurality of LEDs are connected in series to form an LED lightbar. For a large LCD device, a plurality of LED lightbars shall be connected in parallel for use. Each LED lightbar is connected in series with a dimming controllable switch for dimming. When the LED lightbars are short-circuited, or several LEDs in one LED lightbar are short-circuited, the dimming controllable switch will withstand a high voltage difference when being switched off and will be easily damaged.

SUMMARY

In view of the above-described problems, an aim of the present disclosure is to provide a light emitting diode (LED) backlight driving circuit, a backlight module, and a liquid crystal display (LCD) device capable of solving a voltage withstanding problem of a dimming controllable switch when being switched off.

The purpose of the present disclosure is achieved by the following technical schemes:

An LED backlight driving circuit comprises LED lightbar(s) and a control module. The control module comprises a dimming controllable switch, and the LED lightbar(s) are connected with the dimming controllable switch in series. Two ends of the dimming controllable switch are connected with a varistor in parallel.

Preferably, an output end of the LED lightbar is also coupled with a clamping circuit for limiting a voltage of the dimming controllable switch. When the dimming controllable switch is switched off and the voltage is overhigh, the clamping circuit can forcibly reduce the voltage of the dimming controllable switch. Thus, the dimming controllable switch is protected when the varistor is damaged or reaction speed is not enough fast. The voltage withstanding problem of the dimming controllable switch is further solved; and reliability of the drive is enhanced.

In one example, the clamping circuit comprises a storage capacitor and a discharge resistor which are connected in parallel. One end of the storage capacitor and the discharge resistor is coupled with a reference voltage, and the other end is coupled to the output end of the LED lightbar. The reference voltage is lower than a supply voltage. This is a specific clamping circuit. When the voltage of the output end of the LED lightbar (i.e. the voltage of the dimming controllable switch) exceeds the reference voltage, the storage capacitor absorbs the electric energy of a branch circuit of the LED lightbars and reduces the voltage of the dimming controllable switch.

In one example, the storage capacitor and the discharge resistor are coupled to the output end of the LED lightbar through a diode. An anode of the diode is connected to the output end of the LED lightbar, and a cathode of the diode is connected with the storage capacitor and the discharge resistor. By adopting the diode, reverse current is avoided, a branch circuit of the LED lightbars is protected against disturbance of other control branch circuits, and system stability is enhanced.

In one example, a first resistor and a second resistor are connected in series between a power supply input terminal and a grounding terminal of the LED backlight driving circuit. A feedback end of the control module and the cathode of the diode are respectively coupled between the first resistor and the second resistor. This is a specific overvoltage protection circuit. The voltage of the output end of the LED lightbar is collected in a voltage division mode by the resistors. When the voltage is overhigh, the dimming controllable switch is switched off to be further protected.

In one example, there are a plurality of LED lightbars. The output end of each LED lightbar is individually connected with the varistor in parallel. Thus, each LED lightbar is connected with an individual varistor in parallel. If the varistor of one LED lightbar is damaged, normal work of other LED lightbars is not affected.

In one example, there are a plurality of LED lightbars. The output end of each LED lightbar is connected to the same varistor. Because it is rare that a plurality of LED lightbars are simultaneously short-circuited, sharing the varistor can simplify the circuit and reduce cost.

In one example, the output end of the LED lightbar is also coupled with a clamping circuit for limiting the voltage of the dimming controllable switch. The clamping circuit comprises a storage capacitor and a discharge resistor which are connected in parallel. One end of the storage capacitor and the discharge resistor is coupled with a reference voltage and the other end is coupled to the output end of the LED lightbar through a diode. The reference voltage is lower than a supply voltage. An anode of the diode is connected to the output end of the LED lightbar, and a cathode of the diode is connected with the storage capacitor and the discharge resistor. A first resistor and a second resistor are connected in series between a power supply input terminal and a grounding terminal of the LED backlight driving circuit. A feedback end of the control module and the cathode of the diode are respectively coupled between the first resistor and the second resistor. This is a preferred specific circuit structure of the LED backlight driving circuit.

A backlight module comprises the LED backlight driving circuit mentioned above.

An LCD device comprises the backlight module mentioned above.

Because two ends of the dimming controllable switch are connected with a varistor in parallel, when the dimming switch is switched on, current of the branch circuit of the LED lightbar is increased. On the premise that total voltage is fixed, the current is increased, and the voltage withstood by the LED lightbars is increased. At this moment, the voltage withstood by the dimming controllable switch is correspondingly reduced. Correspondingly, the varistor connected in parallel withstands very low voltage and is in a high resistance state. When the dimming controllable switch is switched off, the current of the branch circuit is suddenly reduced. At this moment, the voltage withstood by the LED lightbars is also greatly reduced, and the voltage on both ends of the dimming controllable switch is increased. Then, under action of high voltage, the resistance of the varistor connected in parallel is reduced, and the current of a new branch circuit formed by the LED lightbars and the varistor is increased as well. Thus, the voltage withstood by the LED lightbars is increased again, and the voltage on two ends of the dimming controllable switch is reduced, thereby solving the problem of overhigh withstanding voltage when the dimming controllable switch is switched off.

BRIEF DESCRIPTION OF FIGURES

FIG. 1 is a schematic diagram of an example of the present disclosure.

DETAILED DESCRIPTION

A liquid crystal display (LCD) device comprises an LCD device and a backlight module. The backlight module comprises a light emitting diode (LED) backlight driving circuit. The LED backlight driving circuit of the present disclosure comprises LED lightbar(s) and a control module. The control module comprises a dimming controllable switch. The LED lightbars are connected with the dimming controllable switch in series; and two ends of the dimming controllable switch are connected with a varistor in parallel.

Because two ends of the dimming controllable switch are connected with a varistor in parallel, when the dimming switch is switched on, current of a branch circuit of the LED lightbar is increased. On the premise that total voltage is fixed, the current is increased, and the voltage withstood by the LED lightbars is increased. At this moment, the voltage withstood by the dimming controllable switch is correspondingly reduced. Correspondingly, the varistor connected in parallel withstands very low voltage and is in a high resistance state. When the dimming controllable switch is switched off, the current of the branch circuit is suddenly reduced. At this moment, the voltage withstood by the LED lightbars is also greatly reduced, and the voltage on both ends of the dimming controllable switch is increased. Then, under action of high voltage, the resistance of the varistor connected in parallel is reduced, and the current of a new branch circuit formed by the LED lightbars and the varistor is increased as well. Thus, the voltage withstood by the LED lightbars is increased again and the voltage on two ends of the dimming controllable switch is reduced, thereby solving a problem of overhigh withstanding voltage when the dimming controllable switch is switched off. The present disclosure will be further described in accordance with the figures and preferred examples.

FIG. 1 shows one example of the present disclosure. The LED backlight driving circuit comprises a plurality of LED lightbars connected in parallel. Each lightbar is connected with a dimming controllable switch Q1 in series (namely, an output end of each LED lightbar is connected with the dimming controllable switch Q1). The dimming controllable switch Q1 is integrated into a control module 100 (i.e. IC in the figure). Integrated circuit (IC) outputs a PWM signal for controlling disconnection of the dimming controllable switch Q1, and duty ratio of PWM is adjusted to realize the dimming of the LED lightbars. Two ends of the dimming controllable switch Q1 are connected with a varistor R1 in parallel.

The output end of the LED lightbar is further coupled with a clamping circuit 200 for limiting the voltage of the dimming controllable switch. The clamping circuit 200 comprises a storage capacitor and a discharge resistor which are connected in parallel. One end of the storage capacitor C1 and the discharge resistor R2 is coupled with a reference voltage VIN, and the other end is coupled to the output end of the LED lightbar through a diode D8. An anode of the diode D8 is connected to the output end of the LED lightbar and a cathode of the diode D8 is connected with the storage capacitor C1 and the discharge resistor R2. The reference voltage VIN is lower than supply voltage VOUT. The clamping circuit 200 can forcibly reduce the voltage of the dimming controllable switch. Thus, the dimming controllable switch is protected when the varistor is damaged or reaction speed is not enough fast. Specifically, when the voltage of the output end of the LED lightbar (i.e. the voltage of the dimming controllable switch) exceeds the reference voltage, the storage capacitor absorbs electric energy of a branch circuit of the LED lightbars and reduces the voltage of the dimming controllable switch. By adopting the clamping circuit, the voltage withstanding problem of the dimming controllable switch is further solved, and reliability of the drive is enhanced. By adopting the diode, reverse current is avoided, the branch circuit of the LED lightbars is protected against the disturbance of other control branch circuits, and the system stability is enhanced.

A first resistor R3 and a second resistor R4 are connected in series between a power supply input terminal and a grounding terminal of the LED backlight driving circuit. A feedback end of IC and the cathode of the diode are respectively coupled between the first resistor and the second resistor, namely that the feedback end of IC is coupled to the output end of the LED lightbar through the diode, and the voltage of the dimming controllable switch can be detected. Once an overvoltage phenomenon occurs, IC itself can assume overvoltage protection to switch off the dimming controllable switch for protecting the dimming controllable switch. The reliability is further enhanced.

In the present disclosure, the output end of each LED lightbar can be individually connected with an independent varistor in parallel. Thus, each LED lightbar is connected with an individual varistor in parallel. If the varistor of one LED lightbar is damaged, normal work of other LED lightbars is not affected. However, it is rare that a plurality of LED lightbars are simultaneously short-circuited. Thus, it is feasible to connect the output end of each LED lightbar to the same varistor. Moreover, sharing the varistor can simplify the circuit and reduce cost.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A light emitting diode (LED) backlight driving circuit, comprising:
    a light emitting diode (LED) lightbar(s) and
    a control module comprising a dimming controllable switch;
    wherein the LED lightbars are connected with the dimming controllable switch in series, and two ends of the dimming controllable switch are connected with a varistor in parallel,
    an output end of the LED lightbar coupled with a clamping circuit for limiting a voltage of the dimming controllable switch, and
    wherein the clamping circuit comprises a storage capacitor and a discharge resistor which are connected in parallel;

one end of the storage capacitor and the discharge resistor is coupled with a reference voltage, and the other end is coupled to the output end of the LED lightbar; the reference voltage is lower than a supply voltage.

2. The LED backlight driving circuit of claim 1, wherein the storage capacitor and the discharge resistor are coupled to the output end of each the LED lightbar through a diode; an anode of the diode is connected to the output end of the LED lightbar, and a cathode of the diode is connected with the storage capacitor and the discharge resistor.

3. The LED backlight driving circuit of claim 2, wherein a first resistor and a second resistor are connected in series between a power supply input terminal and a grounding terminal of the LED backlight driving circuit; a feedback end of the control module and the cathode of the diode are respectively coupled between the first resistor and the second resistor.

4. The LED backlight driving circuit of claim 1, wherein there are a plurality of the LED lightbars; the output end of each LED lightbar is individually connected with the varistor in parallel.

5. The LED backlight driving circuit of claim 1, wherein there are a plurality of the LED lightbars; the output end of each LED lightbar is connected to the same varistor.

6. The LED backlight driving circuit of claim 1, wherein a diode is connected between the other end and the output end of the LED lightbar, an anode of the diode is connected to the output end of the LED lightbar, and a cathode of the diode is connected with the storage capacitor and the discharge resistor; a first resistor and a second resistor are connected in series between a power supply input terminal and a grounding terminal of the LED backlight driving circuit; a feedback end of the control module and the cathode of the diode are respectively coupled between the first resistor and the second resistor.

7. A backlight module, comprising:
   a light emitting diode (LED) backlight driving circuit comprising a LED lightbar(s) and a control module;
   wherein the control module comprises a dimming controllable switch; and
   wherein the LED lightbars are connected with the dimming controllable switch in series, and two ends of the dimming controllable switch are connected with a varistor in parallel,
   an output end of the LED lightbar coupled with a clamping circuit for limiting a voltage of the dimming controllable switch, and
   wherein the clamping circuit comprises a storage capacitor and a discharge resistor which are connected in parallel; one end of the storage capacitor and the discharge resistor is coupled with a reference voltage, and the other end is coupled to the output end of the LED lightbar; the reference voltage is lower than a supply voltage.

8. The backlight module of claim 7, wherein the storage capacitor and the discharge resistor are coupled to the output end of the LED lightbar through a diode; an anode of the diode is connected to the output end of each the LED lightbar, and a cathode of the diode is connected with the storage capacitor and the discharge resistor.

9. The backlight module of claim 8, wherein a first resistor and a second resistor are connected in series between a power supply input terminal and a grounding terminal of the LED backlight driving circuit; a feedback end of the control module and the cathode of the diode are respectively coupled between the first resistor and the second resistor.

10. The backlight module of claim 7, wherein there are a plurality of the LED lightbars; the output end of each LED lightbar is individually connected with the varistor in parallel.

11. The backlight module of claim 7, wherein there are a plurality of the LED lightbars; the output end of each LED lightbar is connected to the same varistor.

12. The backlight module of claim 7, wherein a diode is connected between the other end and the output end of the LED lightbar, an anode of the diode is connected to the output end of the LED lightbar, and a cathode of the diode is connected with the storage capacitor and the discharge resistor; a first resistor and a second resistor are connected in series between a power input terminal and a grounding terminal of the LED backlight driving circuit; a feedback end of the control module and the cathode of the diode are respectively coupled between the first resistor and the second resistor.

13. A liquid crystal display (LCD) device, comprising:
   a backlight module comprising:
   a light emitting diode (LED) backlight driving circuit comprising a LED lightbar(s) and a control module;
   wherein the control module comprises a dimming controllable switch; and
   wherein the LED lightbars are connected with the dimming controllable switch in series, and two ends of the dimming controllable switch are connected with a varistor in parallel,
   an output end of the LED lightbar coupled with a clamping circuit for limiting a voltage of the dimming controllable switch, and
   wherein the clamping circuit comprises a storage capacitor and a discharge resistor which are connected in parallel; one end of the storage capacitor and the discharge resistor is coupled with a reference voltage, and the other end is coupled to the output end of the LED lightbar; the reference voltage is lower than a supply voltage.

14. The LCD device of claim 13, wherein there are a plurality of the LED lightbars; the output end of each LED lightbar is individually connected with the varistor in parallel.

15. The LCD device of claim 13, wherein there are a plurality of the LED lightbars; the output end of each LED lightbar is connected to the same varistor.

16. The LCD device of claim 13, wherein a diode is connected between the other end and the output end of the LED lightbar, an anode of the diode is connected to the output end of the LED lightbar, and a cathode of the diode is connected with the storage capacitor and the discharge resistor; a first resistor and a second resistor are connected in series between a power input terminal and a grounding terminal of the LED backlight driving circuit; a feedback end of the control module and the cathode of the diode are respectively coupled between the first resistor and the second resistor.

* * * * *